(12) United States Patent
Fujisaki et al.

(10) Patent No.: US 8,878,514 B2
(45) Date of Patent: Nov. 4, 2014

(54) POWERING DOWN SWITCHING REGULATOR USING A RAMPED REFERENCE VOLTAGE

(71) Applicant: Dialog Semiconductor GmbH, Kirchheim/Teck-Nabern (DE)

(72) Inventors: Takashi Fujisaki, Tokyo (JP); Hidenori Kobayashi, Kanagawa (JP)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 13/649,314

(22) Filed: Oct. 11, 2012

(65) Prior Publication Data

US 2014/0097815 A1    Apr. 10, 2014

(30) Foreign Application Priority Data

Oct. 5, 2012   (EP) ..................... 12368031

(51) Int. Cl.
    *H02M 3/157* (2006.01)
(52) U.S. Cl.
    USPC .......................... 323/351; 323/283
(58) Field of Classification Search
    CPC ............ H02M 1/36; H02M 1/55; H02M 1/56
    USPC ........................ 323/282, 283, 284, 285, 351
    See application file for complete search history.

(56) References Cited

U.S. PATENT DOCUMENTS

| 4,288,831 | A | 9/1981 | Dolikian |
| 4,717,994 | A | 1/1988 | Diaz et al. |
| 7,023,187 | B2 | 4/2006 | Shearon et al. |
| 7,034,586 | B2 * | 4/2006 | Mehas et al. ................ 327/143 |
| 7,816,896 | B2 * | 10/2010 | Lipcsei et al. ............... 323/271 |
| 2007/0216386 | A1 | 9/2007 | Hagino |
| 2008/0101102 | A1 | 5/2008 | Lipcsei et al. |
| 2013/0127429 | A1 * | 5/2013 | Li ................................ 323/282 |

OTHER PUBLICATIONS

European Search Report, 12368031.6-1809, Mail date—Mar. 14, 2013, Dialog Semiconductor GmbH.

* cited by examiner

*Primary Examiner* — Gary L Laxton
(74) *Attorney, Agent, or Firm* — Saile Ackerman LLC; Stephen B. Ackerman

(57) ABSTRACT

Circuits and related methods for energy efficient battery supplied switching DC-to-DC regulators are disclosed. When entering a power-down state the energy in an output capacitor is harvested and charged back to the battery. This is achieved by ramping-down a reference voltage after a power-down sequence is initiated. The output voltage of the regulator is ramped-down accordingly. At the end of the power down sequence the output voltage of the regulator is down to 0V. The disclosure is especially important for regulators, which frequently are started up and switched down.

10 Claims, 3 Drawing Sheets

POWERING DOWN SWITCHING REGULATOR USING A RAMPED REFERENCE VOLTAGE

BACKGROUND (1) Field of the Disclosure

This disclosure relates generally to the field of switching regulators and in particular to methods and circuits to power down switching regulators.

(2) Description of the Background

In some applications, the switching regulator output should be at ground level in the powered down state. Furthermore it would be desirable to harvest the energy stored in an output capacitor when the regulator is switched off. If the device frequently starts up and shuts down, this energy loss cannot be ignored, especially in systems with a finite energy supply such as battery operated systems.

Therefore it is a challenge for designers of switching regulators to achieve regulators having a most efficient power management.

SUMMARY OF THE DISCLOSURE

A principal object of the present disclosure is to charge back the energy of the output capacitor to a battery when the regulator is powered off.

A further object of the present disclosure is to minimize the number of components required for a switching regulator system.

In accordance with the objects of this disclosure a method to achieve an energy efficient switching DC-to-DC regulator has been achieved. The method disclosed comprises the steps of: (1) providing a switching DC-to-DC regulator supplied by a battery, comprising an error amplifier having as inputs a reference voltage and an output voltage of the regulator, an inductor, an output capacitor, a high pass transistor connected to VDD voltage, a low pass transistor connected to ground, and a processing logic unit, (2) initiating a power-down request at the processing logic unit, (3) ramping down the reference voltage to 0 Volt such that the output voltage is ramped down to 0V by the regulator's switching regulation and a current through the inductor changes its direction and flows from the capacitor side to the battery's port and ground, and (4) shutting-off the regulator's switching regulation completely when the reference voltage reaches 0V and open the high pass transistor and close the low pass transistor to keep the output voltage at 0V.

In accordance with the objects of this disclosure circuits of an energy efficient switching DC-to-DC regulator have been achieved. The circuits firstly comprise; a port for a battery supply voltage, an error amplifier having two inputs and an output, wherein a first input is a reference voltage and a second input is an output voltage of the switching regulator, and the output of the amplifier controls a pulse-width modulation control unit controlling a configuration of switches configured to convert and regulate a DC voltage using an inductor, and said pulse-width modulation control unit. Furthermore the circuits comprise said configuration of switches configured to convert and regulate a DC voltage using an inductor, said inductor, wherein a second terminal is connected is connected to an output port of the switching regulator and to a first terminal of an output capacitor, said output capacitor, wherein a second terminal is connected to ground, and said output port.

BRIEF DESCRIPTION OF THE DRAWINGS

In the accompanying drawings forming a material part of this description, there is shown.

DESCRIPTION OF THE PREFERRED EMBODIMENTS

The preferred embodiments of the present disclosure disclose circuits and related methods for switching regulators being at ground level in the powered down state.

Figure 1:
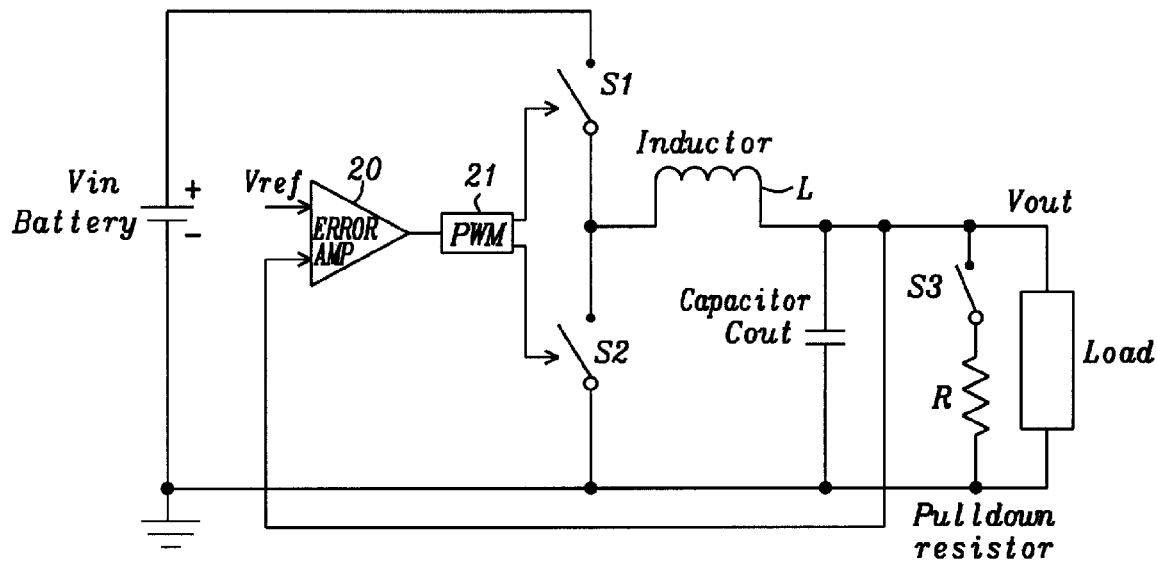
FIG. 1 shows a switching regulator block diagram with active pull-down function.

FIG. 1 shows a switching regulator block diagram with active pull-down function. When power down is requested, S3 is immediately turned-on, while the pass transistors of the buck S1 and S2 are turned-off (the switch is open).

The output capacitor Cout is discharged through S3 and the pull down resistor. The output voltage is going down to 0V according to the time constant which is defined by Cout and resistance R.

There are two drawbacks of this system. First, additional circuit components S3 and R are required only for active-pull down. Secondly, all the energy which was stored in the Cout is dissipated by R. In battery operated system (e.g. most portable electronic devices such as mobile phones) these losses in energy cannot be ignored, especially if capacitor Cout is large and if the system goes frequently through shutdown and start-up cycles.

To solve the drawbacks mentioned above, FIG. 2 shows an improved embodiment of the disclosure using a switching regulator output stage to ramp down the output voltage by ramping down a reference voltage when the device goes to the power down mode. An error amplifier 20 controls the operation of the switched regulator by comparing the reference voltage Vref with the output voltage Vout and controlling the pulse-width modulation unit 21 according to a difference between both inputs. The switching regulator reference voltage is ramped down to 0V after shutdown, in this case the output capacitor is discharged through the inductor L, and the energy goes back to the input. If switching regulator input is connected to the battery, this battery will be charged, and can be used next time or other device which connected to that battery.

At the moment the discharge of the output capacitor through the inductor L is finished the output voltage Vout is ramped down to 0 Volt, the high pass transistor S1 is kept off, and low pass transistor S2 set ON to keep Vout 0 Volt. No extra power switch is required for these operations, discharging the output capacitor and charging it back to the battery, and keeping Vout 0 volt during power down state.

Figure 2:
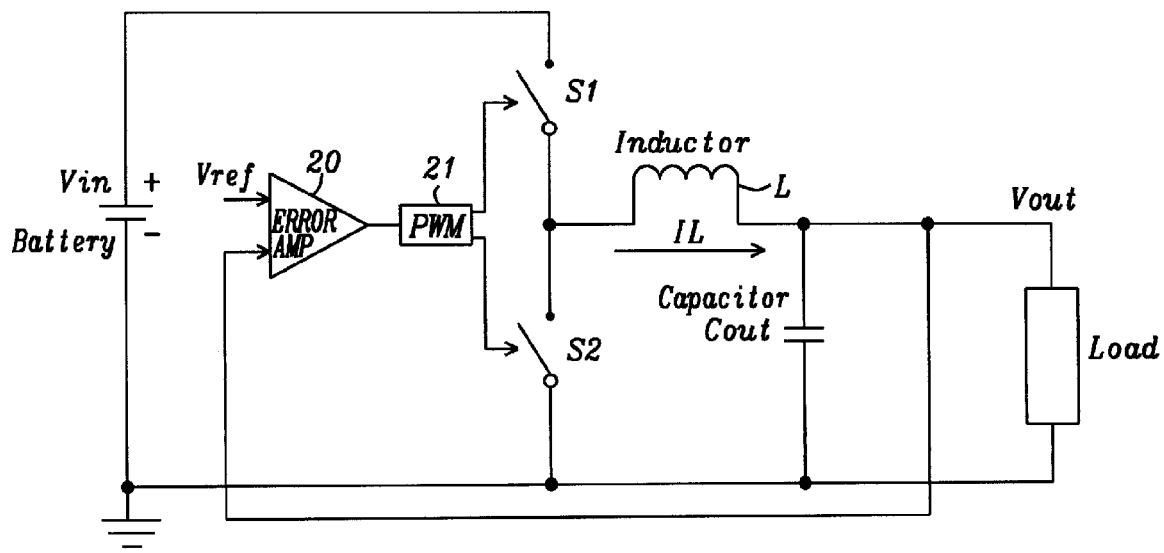
FIG. 2 shows an improved embodiment of the disclosure using a switching regulator output stage to pull-down the output voltage when the device goes to the power down mode.

In the improved circuit shown in FIG. 2 there is no active pull-down switch, as S3 in FIG. 1 and no resistor required.

It should be noted that FIG. 2 shows only an exemplary circuit of a switched DC-to-DC regulator but it shows the key elements of the disclosure, i.e. that a reference voltage, which is ramped down to 0V during a power-down sequence and subsequently the output voltage is ramped down to 0V also. FIG. 2 discloses key elements of a switched DC-to-DC regulator, namely a first and a second pass transistor connected to an inductor and an output capacitor. The disclosure is applicable to many different configurations of switches configured to convert and regulate DC voltages of DC-to-DC switching regulators.

The buck regulator of FIG. 2 is kept active for a while after the shutdown request while it discharges the output voltage from the capacitor Cout though the inductor L before shutting down.

Figure 3:
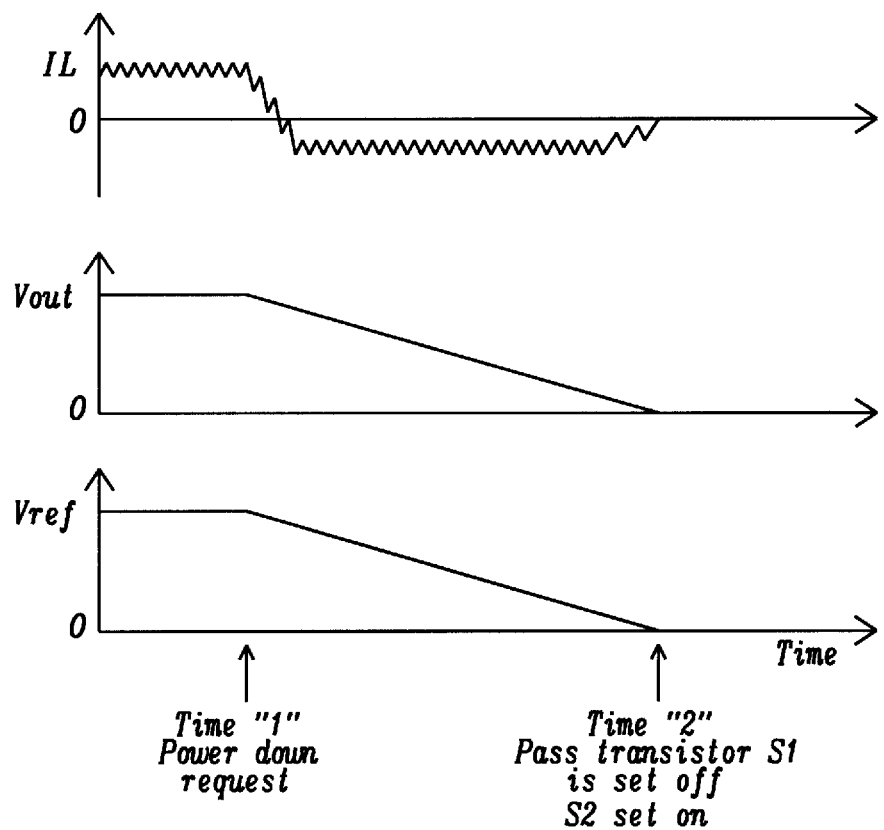
FIG. 3 shows time charts of the current through the inductor L, output voltage Vout and the reference voltage Vref to illustrate how the shutdown is achieved.

FIG. 3 shows time charts of the current $I_L$ through the inductor L, output voltage Vout and the reference voltage Vref to illustrate how the shutdown is achieved:

1) As shown in FIG. 3, when the power down request comes in (time "1"), Vref shown also in FIG. 2, is ramped down to 0V at first as shown in FIG. 3 such that Vout is ramped down to 0V, and current $I_L$ changes the direction, and flows from capacitor side to Vin side thought inductor.
2) When Vref has reached 0V (time "2"), the switching regulation for this ramp down is shut off, switch S1 is opened and switch S2 is closed.

The order of magnitude of the time difference between time "1" and time"2" depends on output voltage Vout at the point of time when shut down is requested and on the ramping down rate. The ramping down rate is programmable and ranges in the preferred embodiment of the disclosure e.g. from 1.25 mV/ps to 40 mV/μs. Other ramping down rates are possible as well. So, if Vout is 1V and the ramp down rate is 10 mV/μs, the time difference between time "1" and time "2" is 100 μs. The time difference may range in the order of magnitude of e.g. from hundreds μs order to tens μs.

The reference voltage Vref may ramped down via output of a digital-to-analog converter (DAC) and this DAC code is ramped down by the digital circuit control.

At the moment when S1 is closed and S2 is opened in switching regulation of ramp down sequence, inductor's magnetic energy is discharged and current from inductor to Vin flows, and the battery is recharged.

Throughout this ramp down sequence the energy is capacitor is harvested in battery.

Figure 4:
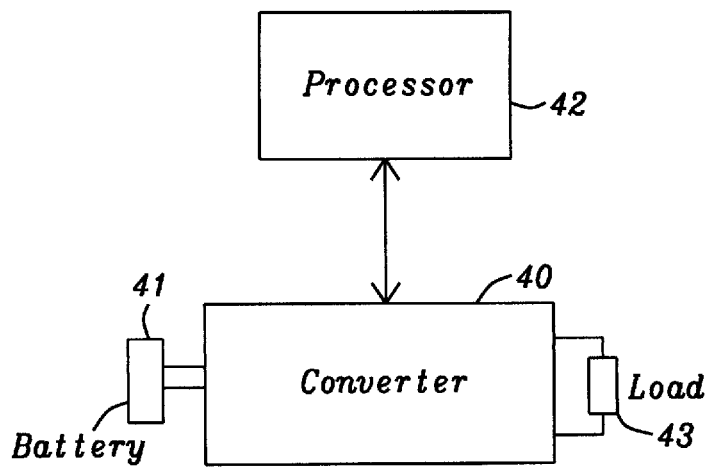
FIG. 4 shows the basic elements of the disclosure. It shows the switched regulator, the battery, the processing logic performing ramp down control, and the load.

A processor controls the sequence of the power-down process. FIG. 4 shows the basic elements of the disclosure. It shows the switched regulator 40, the battery 41, the processing logic 42 performing ramp control, and the load 43.

Figure 5:
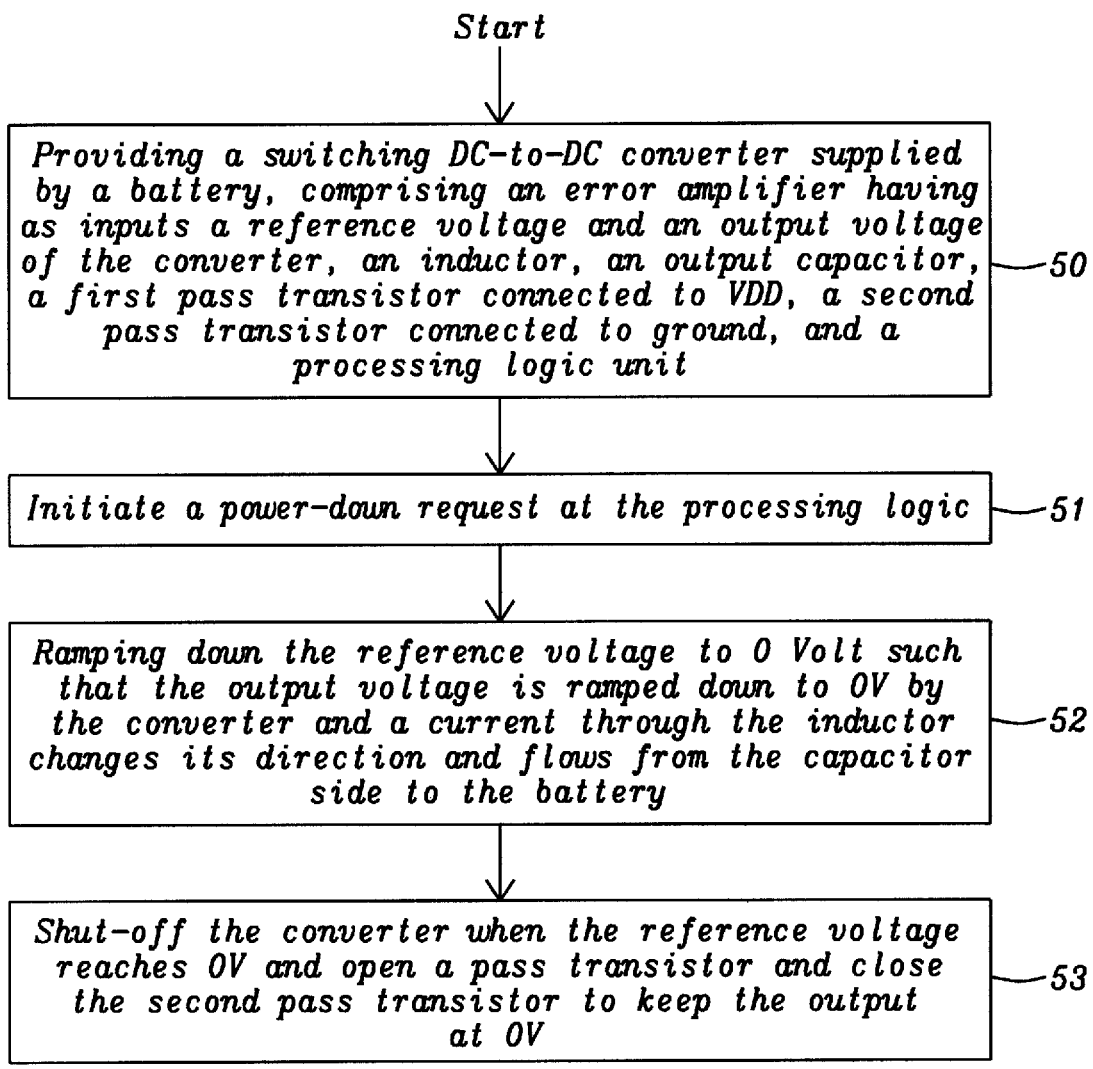
FIG. 5 illustrates a flowchart of a method to perform code profiling for processing devices having a low duty cycle.

FIG. 5 illustrates a flowchart of a method to achieve an energy efficient switching DC-to-DC regulator. A first step 50 describes the provision of a switching DC-to-DC regulator supplied by a battery, comprising an error amplifier having as inputs a reference voltage and an output voltage of the regulator, an inductor, an output capacitor, a high pass transistor connected to VDD voltage, a low pass transistor connected to ground, and a processing logic unit. Step 51 shows initiating a power-down request at the processing unit. Step 52 shows ramping down the reference voltage to 0 Volt such that the output voltage is ramped down to 0V by the regulator and a current through the inductor changes its direction and flows from the capacitor side to the battery's port and ground. Step 53 depicts shutting-off the regulator completely when the reference voltage reaches 0V and open the high pass transistor and close the low pass transistor to keep the output voltage at 0V.

In summary essential features of the disclosure are:
Output voltage ramp down control using switching regulation prior to entering power down state, and.
Pass transistor turn-on/off control in power down state.

While the disclosure has been particularly shown and described with reference to the preferred embodiments thereof, it will be understood by those skilled in the art that various changes in form and details may be made without departing from the spirit and scope of the disclosure.

What is claimed is:

1. A method to achieve an energy efficient switching DC-to-DC regulator, comprising the steps of:
    (1) providing a switching DC-to-DC regulator supplied by a battery, comprising an error amplifier having as inputs a reference voltage and an output voltage of the regulator, an inductor, an output capacitor, a high pass transistor connected to VDD voltage, a low pass transistor connected to ground, and a processing logic unit;
    (2) initiating a power-down request at the processing logic unit;
    (3) ramping down the reference voltage to 0 Volt such that the output voltage is ramped down to 0V by a regulator's switching regulation and a current through the inductor changes its direction and flows from a capacitor side to a battery's port in order to recharge the battery, wherein said ramping down the reference voltage is performed by an output of a digital-to-analog converter (DAC) and a DAC code is ramped down by the processing logic unit; and
    (4) shutting-off the regulator's switching regulation completely, when the reference voltage reaches 0V, and open the high pass transistor and close the low pass transistor to keep the output voltage at 0V.

2. The method of claim 1 wherein the switching regulator is a buck regulator.

3. The method of claim 1 wherein the regulator is kept active for a short period of time to allowing discharging the output voltage from the capacitor through the inductor before shutting down.

4. The method of claim 3 wherein said short period ranges from about hundreds of μs to tens of μs.

5. The method of claim 1 wherein the switching regulator reaches ground level during power down sequence and in power down state.

6. A circuit of an energy efficient switching DC-to-DC regulator comprising:
    a port for a battery supply voltage;
    an error amplifier having two inputs and an output, wherein a first input is a reference voltage and a second input is connected to an output of the switching regulator, and the output of the amplifier is capable of controlling a pulse-width modulation control unit which is capable of controlling a configuration of switches configured to convert the battery supply voltage and regulate the output voltage of the switching regulator via an inductor;
    said pulse-width modulation control unit;
    said configuration of switches;
    said inductor, wherein a first terminal of the inductor is connected to said configuration of switches and a second terminal of the inductor is connected to an output port of the switching regulator and to a first terminal of an output capacitor;
    said output capacitor, wherein a second terminal of the capacitor is connected to ground; and
    said output port of the switching regulator;
    wherein the DC-to-DC regulator is capable of ramping down the reference voltage and an output voltage of the DC-to-DC regulator to 0 Volt and recharging the battery with a charge stored in the output capacitor during powering-down the DC-to-DC regulator without requiring a pull-down switch, and wherein an output of a digital-to-analog converter (DAC) is capable of said ramping down the reference voltage and a processing logic unit is capable of ramping down a digital input of the DAC in order to subsequently ramping down the output of the DAC.

7. The circuit of claim 6 wherein the regulator is a buck regulator.

8. The circuit of claim 6 wherein the switching regulator is configured to reach ground level during power down sequence and in power down state.

9. The circuit of claim 6 wherein said configuration of switches comprises a high and a low pass transistor being connected in series between the supply voltage and ground wherein a middle point between both transistors is connected to a first terminal of the inductor.

10. The circuit of claim 9 wherein the first pass transistor is configured to open and the second pass transistor is configured to clos when the reference voltage has been ramped down to 0V.

* * * * *